(12) United States Patent
Sigaud et al.

(10) Patent No.: US 12,534,060 B2
(45) Date of Patent: Jan. 27, 2026

(54) UNIT FOR CONTROLLING THE POWER MANAGEMENT OF A HEATING SYSTEM OF A CATALYTIC CONVERTER FOR A MOTOR VEHICLE

(71) Applicant: Vitesco Technologies GmbH, Regensburg (DE)

(72) Inventors: Alexandre Sigaud, Toulouse (FR); Damien Verdier, Toulouse (FR)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 75 days.

(21) Appl. No.: 18/691,689

(22) PCT Filed: Sep. 2, 2022

(86) PCT No.: PCT/EP2022/074496
§ 371 (c)(1),
(2) Date: Mar. 13, 2024

(87) PCT Pub. No.: WO2023/041355
PCT Pub. Date: Mar. 23, 2023

(65) Prior Publication Data
US 2025/0121811 A1    Apr. 17, 2025

(30) Foreign Application Priority Data
Sep. 14, 2021   (FR) ...................... 2109595

(51) Int. Cl.
*B60W 10/08*  (2006.01)
*B60W 20/13*  (2016.01)
*B60W 50/00*  (2006.01)

(52) U.S. Cl.
CPC ............ *B60W 10/08* (2013.01); *B60W 20/13* (2016.01); *B60W 2050/0042* (2013.01);
(Continued)

(58) Field of Classification Search
CPC ................ B60W 10/08; B60W 20/13; B60W 2050/0042; B60W 2510/244;
(Continued)

(56) References Cited

U.S. PATENT DOCUMENTS 5,492,190 A      2/1996  Yoshida
12,168,949 B2 *  12/2024 Girard ................... F01N 3/2013
(Continued)

FOREIGN PATENT DOCUMENTS

DE   102019124788 A1   8/2020
WO      2008120555 A1   10/2008

OTHER PUBLICATIONS

International Search Report (PCT/ISA/210) with translation and Written Opinion (PCT/ISA/237) mailed on Oct. 12, 2022, by the European Patent Office as the International Searching Authority for International Application No. PCT/EP2022/074496. (12 pages).

*Primary Examiner* — Brian P Sweeney
(74) *Attorney, Agent, or Firm* — Buchanan Ingersoll & Rooney PC

(57) ABSTRACT

A control unit for a hybrid motor vehicle with a combustion engine, the motor vehicle including: an electric network; a catalytic converter including an electric heating system connected to the electric network; a battery electrically connected to the electric network; an electric machine electrically connected to the electric network. The electronic control unit being configured for: activating the generator mode of the electric machine; electrically connecting the heating system to the electric power supply network at a first time, defined after a first predetermined delay with respect to the activation time of the generator mode; and activating the motor mode of the electric machine, at a second time, (Continued)

defined after the first time; disconnecting the heating system from the electric network at a "disconnection" time, defined after the second time.

12 Claims, 5 Drawing Sheets

(52) U.S. Cl.
CPC . *B60W 2510/244* (2013.01); *B60W 2510/246* (2013.01); *B60Y 2300/472* (2013.01)

(58) Field of Classification Search
CPC ... B60W 2510/246; B60W 2050/0026; B60W 2050/0027; B60W 2530/12; B60W 2710/08; B60W 2710/248; B60W 10/26; B60Y 2300/472; B60Y 2300/474; B60Y 2300/476; B60K 6/485
See application file for complete search history.

(56) References Cited

U.S. PATENT DOCUMENTS

| | | | |
|---|---|---|---|
| 2013/0338864 A1* | 12/2013 | Shallvari | F02D 41/024 180/65.28 |
| 2019/0232948 A1 | 8/2019 | Nawata | |

\* cited by examiner

UNIT FOR CONTROLLING THE POWER MANAGEMENT OF A HEATING SYSTEM OF A CATALYTIC CONVERTER FOR A MOTOR VEHICLE

CROSS REFERENCE TO RELATED APPLICATIONS

This application is the U.S. National Phase Application of PCT International Application No. PCT/EP2022/074496, filed Sep. 2, 2022, which claims priority to French Patent Application No. FR2109595, filed Sep. 14, 2021, the contents of such applications being incorporated by reference herein.

FIELD OF THE INVENTION

The invention relates to the field of hybrid or thermal motor vehicles, comprising a system for depolluting exhaust gases comprising a heating system, and, more specifically, to the electric power supply of the heating system.

BACKGROUND OF THE INVENTION

In a known manner, a thermal or hybrid motor vehicle, comprises a catalyst, also called "catalytic converter", for depolluting the exhaust gases emitted by the combustion engine of the vehicle.

The catalytic converter notably can be an electrically heated catalytic converter, commonly called "EHC" (Electrical Heated Catalyst). This type of catalytic converter comprises a heating system allowing the temperature in the catalytic converter to be increased rapidly.

Still in a known manner, such a vehicle also comprises a battery and an electric machine. The electric machine is able to operate in two operating modes: a motor operating mode, in which the electric machine converts electric energy into mechanical energy in order to start or assist the engine, and a generator operating mode, in which the machine converts the mechanical energy for running the engine into electric energy stored in the battery.

Notably, the electric machine and the battery allow the electric network of the vehicle to be powered with electric energy, in order to power various items of vehicle equipment, such as, for example, DC voltage converters or the catalytic converter heating device with DC voltage.

For example, patent application DE 10 2019/124788 A1, incorporated herein by reference, notably describes a catalytic converter heating device able to be powered with electric energy by the electric network of the vehicle, with the electric network itself being powered by the electric machine. In addition, patent application U.S. Pat. No. 5,492,190 A and application WO 2008/120555 A1, each incorporated herein by reference, each describe a vehicle comprising an electric network, as well as an electric machine, a battery, and a catalytic converter heating device, with all three being connected to the electric network.

When the catalytic converter heating system is started, it must be powered. When the heating system is started, both the battery and the electric machine are activated in order to supply electric energy to the electric network. However, it is mainly the battery that supplies the electric energy to the electric network and therefore to the heating system. Indeed, the reaction time of the electric machine is relatively high and it is not able to supply electric energy to the electric network and therefore to the heating system as soon as the heating system is started.

The value of the current supplied by the battery when the heating system is started can be greater than the value of the maximum discharge threshold of the battery. Similarly, when the heating system is deactivated, the battery operates in its charge mode, and the value of the current entering the battery can be greater than the value of the maximum charge threshold of the battery. When this effect is repeated several times, it can alter the operation of the battery and lead to premature ageing of the battery.

Therefore, a solution is required for at least partly overcoming these disadvantages.

SUMMARY OF THE INVENTION

An aspect of the invention relates to a control unit for a motor vehicle with a combustion engine, said motor vehicle comprising:
a. an electric network;
b. a catalytic converter able to depollute the exhaust gases emitted by the combustion engine and comprising an electric heating system connected to the electric network;
c. a battery electrically connected to the electric network, able to operate in a discharge mode, in which the battery supplies electric energy to the electric network, and in a charge mode, in which the battery is charged from the electric energy supplied by the electric network;
d. an electric machine electrically connected to the electric network, able to operate in a "generator" mode, in which the electric machine supplies electric energy to the electric network, and in a motor mode, in which the electric machine generates mechanical energy from the electric energy supplied by the electric network;
e. said control unit being electrically connected to the electric heating system, to the battery and to the electric machine, and being configured for:
i. activating the generator mode of the electric machine;
ii. electrically connecting the heating system to the electric power supply network at a first time, defined after a first predetermined delay with respect to the activation time of the generator mode;
iii. activating the motor mode of the electric machine, at a second time, defined after the first time;
iv. disconnecting the heating system from the electric network at a "disconnection" time, defined after the second time.

Thus, on the one hand, since activation of the generator mode of the electric machine is carried out before connecting the heating system to the electric network, then the electric machine is able to supply electric energy to the heating system as soon as the heating system is started, via the electric network. Thus, after the first time, the heating system is powered with electric energy by the battery and the electric machine. On the other hand, since the electric machine is deactivated before the disconnection time, at which the heating system is disconnected from the electric network, this prevents the current in the electric machine from being high at the disconnection time, and therefore prevents the absolute value of the charge current in the battery from being high and greater than the absolute value of a maximum charge threshold of the battery. In this way, the current in the battery still ranges between a maximum charge threshold and a maximum discharge threshold, preventing degradation of the battery, and notably a reduction in its state of charge.

Preferably, the battery is characterized by a maximum charge threshold and a maximum discharge threshold, the value of the first time ranges between the value of a first minimum time and a first maximum time:
a. the first minimum time corresponding to the time at which the heating system is electrically connected to the electric network, so that the current in the battery is equal to the maximum discharge threshold predefined at said first minimum time;
b. the first maximum time corresponds to the time at which the heating system is electrically connected to the electric network, so that the current in the battery is equal to the maximum charge threshold at said first maximum time.

Even more preferably, the value of the second time ranges between the value of a second minimum time and a second maximum time:
a. the second minimum time corresponds to the time at which the motor mode of the electric machine is activated, so that at the time of disconnecting the heating system from the electric network, the current in the battery is equal to the maximum discharge threshold;
b. the second maximum time corresponds to the time at which the motor mode of the electric machine is activated, so that at the disconnection time td, the current in the battery is equal to the maximum charge threshold.

Preferably, the control unit comprises a memory zone that stores a correspondence table comprising, for each combination of a state of charge of the battery and a temperature of said battery, the variation in the charge current and in the discharge current of the battery as a function of time, the control unit is configured to determine the variation in the charge current of the battery and the variation in the discharge current of the battery from the temperature of the battery, the state of charge of the battery and the correspondence table.

According to another embodiment, the vehicle comprises a battery monitoring system, commonly called "BMS". The monitoring system is able to measure the temperature and the voltage in the battery, as well as the current traversing the battery, in order to assess the state of charge of the battery. The monitoring system is also configured to estimate, for each combination of a state of charge (or a state of discharge) of the battery and of a temperature of said battery, the variation in the charge current and in the discharge current of the battery, as a function of time and of the completed measurements and on the basis of mathematical models known to a person skilled in the art. The control unit is thus configured to determine the variation in the charge current of the battery and the variation in the discharge current of the battery from the temperature of the battery, the state of charge of the battery and the estimate carried out by the battery monitoring system.

Advantageously, the memory zone comprises: the period, the duty cycle or the temporal pulse width of the current in the heating system and the predefined average intensity of the current in the heating system, the control unit being configured to determine the variation in the current in the heating system from the preceding parameters.

An aspect of the invention also relates to a motor vehicle with a combustion engine comprising:
a. an electric network;
b. a catalytic converter able to depollute the exhaust gases emitted by the internal combustion engine and comprising an electric heating system;
c. a battery electrically connected to the electric network, able to operate in a discharge mode, in which the battery supplies electric energy to the electric network, and in a charge mode, in which the battery is charged from the electric energy supplied by the electric network;
d. an electric machine electrically connected to the electric network, able to operate in a generator mode, in which the electric machine supplies electric energy to the electric network, and in a motor mode, in which the electric machine generates mechanical energy from the electric energy supplied by the electric network;
e. a control unit as described above.

An aspect of the invention also relates to a method for powering a heating system for a hybrid motor vehicle as described above, said method, implemented by the control unit, comprising the steps of:
a. activating the generator mode of the electric machine;
b. electrically connecting the heating system to the electric power supply network at a first time, defined after a first predetermined delay with respect to the activation time of the generator mode;
c. activating the motor mode of the electric machine, at a second time, defined after the first time;
d. disconnecting the heating system from the electric network at a "disconnection" time, defined after the second time.

Preferably, since the battery is characterized by a maximum charge threshold and a maximum discharge threshold, the method comprises, before the electrical connection step, a step of determining the first time, comprising the sub-steps of:
a. determining a first minimum time, the first minimum time corresponding to the time at which the heating system is electrically connected to the electric network, so that the current in the battery is equal to the predefined maximum discharge threshold, at said first minimum time;
b. determining a first maximum time, the first maximum time corresponding to the time at which the heating system is electrically connected to the electric network, so that the current in the battery is equal to the maximum charge threshold at said first maximum time;
c. determining the first time by selecting a value ranging between the value of the first minimum time and the value of the first maximum time.

More preferably, the method comprises, before the step of activating the motor mode of the electric machine, a step of determining the second time, comprising the sub-steps of:
a. determining a second minimum time, the second minimum time corresponding to the time at which the motor mode of the electric machine is activated, so that at the disconnection time, the current in the battery 30 is equal to the maximum discharge threshold;
b. determining a second maximum time, corresponding to the time at which the motor mode of the electric machine is activated, so that at the disconnection time, the current in the battery is equal to the maximum charge threshold;
c. determining the second time by selecting a value ranging between the value of the second minimum time and the value of the second maximum time.

An aspect of the invention also relates to a computer program product, characterized in that it comprises a set of program code instructions, which, when they are executed by one or more processors, configure the one or more processors to implement a method as described above.

BRIEF DESCRIPTION OF THE DRAWINGS

Further features and advantages of aspects of the invention will become more clearly apparent upon reading the following description. This description is purely illustrative and should be read with reference to the appended drawings, in which.

DETAILED DESCRIPTION OF THE PREFERRED EMBODIMENTS

Figure 1:
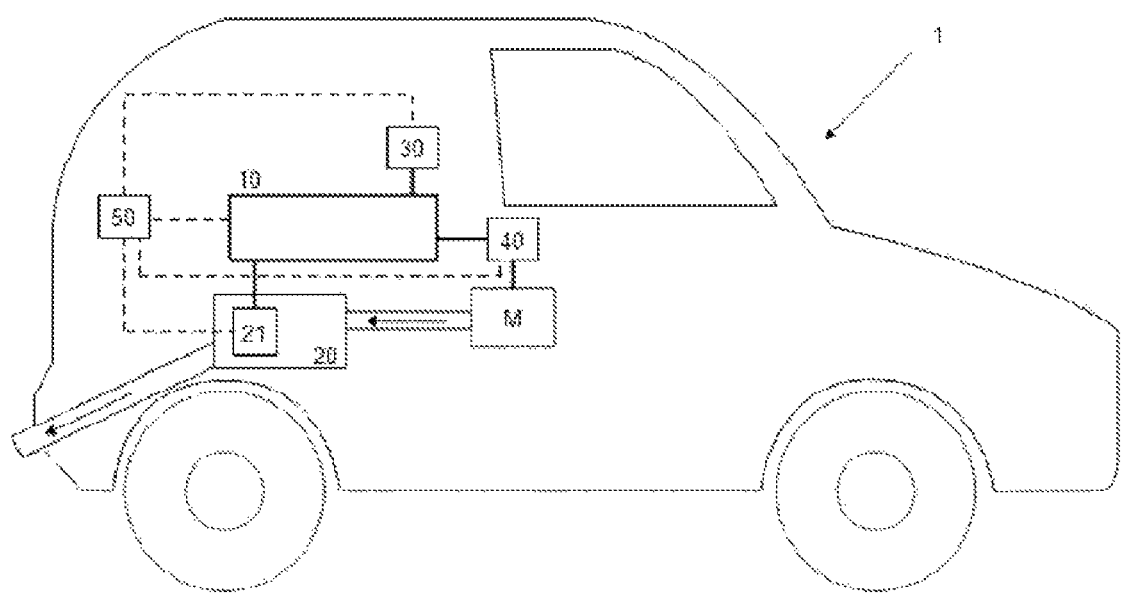
FIG. 1 shows an embodiment of the vehicle according to the invention.

With reference to FIG. 1, an embodiment of a vehicle according to the invention will now be described.

Vehicle 1

The vehicle 1 is a combustion engine vehicle or a hybrid vehicle and therefore comprises a combustion engine M.

The vehicle 1 also comprises an electric network 10, a catalytic converter 20, a battery 30, an electric machine 40 and an electronic control unit 50.

The combustion engine M is notably controlled by an engine control computer (not shown in the figures) also installed in the vehicle 1.

The electric network 10 is notably used to power the electric equipment installed in the vehicle 1 with electric energy. To this end, the electric network 10 comprises at least one electric line installed in the vehicle 1 and electrically connected to the equipment to be powered.

The catalytic converter 20 is notably positioned at the outlet of the combustion engine M, and is intended for depolluting the exhaust gases emitted by the combustion engine M, before the exhaust gases are emitted outside the vehicle 1. For example, in the case of a combustion engine M running on diesel, the catalytic converter 20 converts the carbon monoxide and hydrocarbons in the exhaust gases into carbon dioxide and water. In the case of a combustion engine M running on petrol, the catalytic converter 20 converts the carbon monoxide and nitrogen dioxide in the exhaust gases into carbon dioxide.

In addition, the catalytic converter 20 operates correctly at high temperature. Indeed, a high temperature in the catalytic converter 20 allows the chemical reactions that occur in the catalytic converter 20 to be accelerated, in order to quickly and effectively depollute the exhaust gases from the combustion engine M.

To this end, the catalytic converter 20 comprises an electric heating device 21 for heating the inside of the catalytic converter 20. For this reason, this type of catalytic converter 20 also can be called an "EHC" (Electrically Heated Catalyst) by a person skilled in the art.

The heating device 21 notably comprises a heating resistor, in other words, a resistor that heats up when traversed by an electric current.

A switch connects the heating device 21 to the electric network 10. If the switch is open, the heating device 21 is disconnected from the electric network 10. If the switch is closed, the heating device 21 is connected to the electric network 10. Thus, when the switch is closed, an electric current traverses the heating device 21.

Notably, in the present case, activating the heating device 21 refers to the fact that the switch connects the heating device 21 to the electric network 10. Conversely, deactivating the heating device 21 means that the switch disconnects the heating device 21 from the electric network 10.

The switch can be, for example, a field effect transistor, known to a person skilled in the art as a "MOSFET transistor".

In addition, the vehicle 1 comprises a second control unit, able to control the switch so that it connects or disconnects the heating device 21 to/from the electric network 10. Notably, the second control unit sends a connection signal, respectively a disconnection signal, to the switch for respectively connecting and disconnecting the heating device 21 to/from the electric network 10. Thus, the second control unit commands the activation, respectively the deactivation, of the heating device 21.

Figure 2:
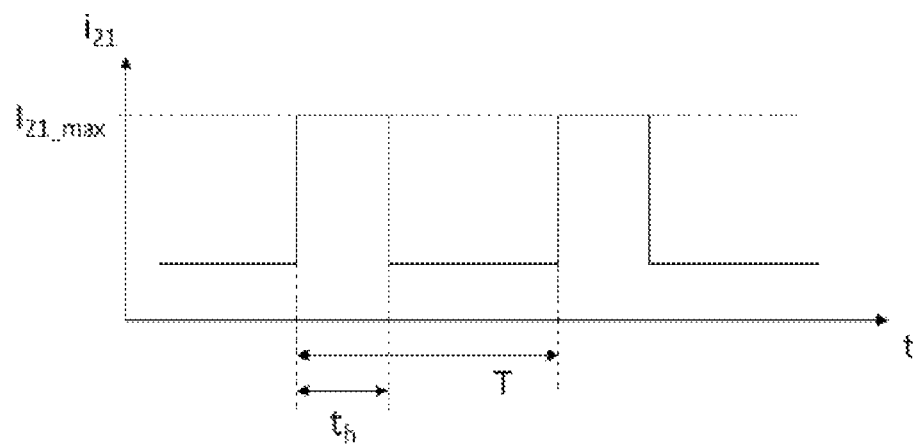
FIG. 2 shows the variation in the current in the catalytic converter heating system according to an aspect of the invention.

With reference to FIG. 2, an example of the variation in the current $i_{21}$ in the heating system 21 as a function of time t is shown. The signal is called a "pulse width modulation" signal and is characterized by a period T and a duty cycle.

The duty cycle is used to determine the temporal pulse width $t_h$ over which the switch connects the heating system 21 to the electric network 10, in other words, the pulse width $t_h$ over which a "high" current $i_{21\_max}$ is applied to the heating system 21. Conversely, over a given period T, outside the temporal pulse width $t_h$, the switch disconnects the heating system 21 from the electric network 10. In other words, no current is applied to the heating system 21. The value of the high intensity $i_{21\_max}$ is defined so that the average intensity over a period T corresponds to a desired, predefined average intensity.

The battery 30 is also electrically connected to the electric network 10.

In addition, the battery 30 is able to operate in a discharge mode, in which the battery 30 supplies electric energy to the electric network 10, and in a charge mode, in which the battery 30 charges from the electric energy supplied by the electric network 10.

The battery 30 is characterized by a maximum charge threshold $I_{30\_ch\_max}$ and a maximum discharge threshold $I_{30\_dch\_max}$. If, on several occasions, the current supplied by the battery 30 is greater than the maximum discharge threshold $I_{30\_dch\_max}$, or if the current entering the battery 30 is greater than the maximum charge threshold $I_{30\_ch\_max}$, this could lead to accelerated and premature ageing of the battery 30.

The electric machine 40 is electrically connected to the electric network 10. More specifically, the electric machine 40 can be a DC machine. The electric machine 40 is notably characterized by a mechanical torque.

The electric machine 40 is able to operate in a generator mode, in which the electric machine 40 converts mechanical energy into electric energy in order to supply electric energy to the electric network 10, and in a motor mode, in which the electric machine 40 produces mechanical energy from the electric energy supplied by the electric network 10.

For example, the electric machine 40 is a reversible alternator.

The control unit 50 is electrically connected to the electric heating system 21, to the battery 30 and to the electric machine 40.

The control unit 50 comprises a memory zone MEM.

The memory zone MEM comprises information relating to the battery 30, and notably the state of charge of the battery 30, the temperature of the battery 30, the value of the maximum charge threshold $I_{30\_ch\_max}$ and the value of the maximum discharge threshold $I_{30\_dch\_max}$ and a correspondence table.

The state of charge of the battery 30 corresponds to the capacity currently remaining in the battery 30. The state of charge of the battery 30 may have been previously sent to the control unit 50, notably by a sensor able to measure the state of charge and/or the state of discharge of the battery 30.

The temperature of the battery 30 corresponds to the current temperature of the battery 30. The value of the temperature of the battery 30 may have been obtained by the control unit 50 by means of a sensor installed next to the battery 30 and able to regularly measure the temperature in said battery 30 and to send each measured value to the control unit 50.

The value of the maximum charge threshold $I_{30\_ch\_max}$ and the value of the maximum discharge threshold $I_{30\_dch\_max}$ notably depend on the type of battery 30, the temperature and the state of charge of said battery 30.

The correspondence table comprises, for each combination of a state of charge (or of a state of discharge) of the battery 30 and a temperature of said battery 30, the variation in the charge current and in the discharge current of the battery 30, as a function of time.

The memory zone MEM also comprises the list of all the equipment connected to the electric network 10.

Finally, the memory zone MEM also comprises information relating to the variation in the current in the heating system 21. With reference to FIG. 2, the memory zone MEM notably comprises: the period T, the duty cycle or the temporal pulse width $t_h$ of the current $i_{21}$ and the predefined average intensity of the current $i_{21}$ in the heating system 21. According to another embodiment, the memory zone MEM directly comprises the variation in the current $i_{21}$ as a function of time t.

In addition, the battery 30 comprises a plurality of charging cells. The vehicle 1 can also comprise a system for monitoring the battery 30, commonly called "BMS" (Battery Monitoring System). The monitoring system is able to measure the temperature and the voltage in each battery cell, as well as the current traversing each cell of the battery 30, in order to assess the state of charge of the battery 30. The monitoring system is also configured to estimate, for each combination of a state of charge (or of a state of discharge) of the battery 30 and a temperature of said battery 30, the variation in the charge current and in the discharge current of the battery 30, as a function of time and of the completed voltage and temperature measurements and on the basis of mathematical models known to a person skilled in the art.

In addition, the monitoring system is able to determine the variation in the current $i_{21}$ in the heating system 21, either by directly measuring the current $i_{21}$ or by using pre-established models.

The control unit 50 can be configured to determine the variation in the charge and discharge current, in the battery 30, from the correspondence table, as a function of the temperature of the battery 30 and of the state of charge (or the state of discharge) of said battery 30. To this end, the control unit 50 selects the variation in the charge current, or in the discharge current, respectively, of the battery 30 from the correspondence table that corresponds to the temperature and to the state of charge or discharge, stored in the memory zone MEM.

In another embodiment, the control unit 50 is able to determine the variation in the charge and discharge current by receiving the estimate carried out by the monitoring system described above.

The control unit 50 is also configured to determine the variation in the current $i_{21}$ in the heating system 21 from the information relating to the variation in the current $i_{21}$ in the heating system 21 stored in the memory zone MEM.

According to another embodiment, the control unit 50 is configured to determine the variation in the current $i_{21}$ by receiving the estimate determined by the monitoring system.

According to yet another embodiment, the control unit 50 can be configured to directly measure the variation in the current $i_{21}$ in the heating system 21.

The control unit is configured to know the duration that separates the first time $t_1$ and a "disconnection" time $t_d$, at which the heating system 21 is disconnected from the network, but is not yet able to know when the first time $t_1$ is defined.

The control unit 50 is also configured to detect the need to activate the heating system 21.

To this end, the control unit 50 can be configured to detect the transmission of a connection signal by the second control unit. The control unit 50 also can be configured to itself estimate, from the variation in the current $i_{21}$, the time from which the high intensity $i_{21\_max}$ is applied.

Figure 3:
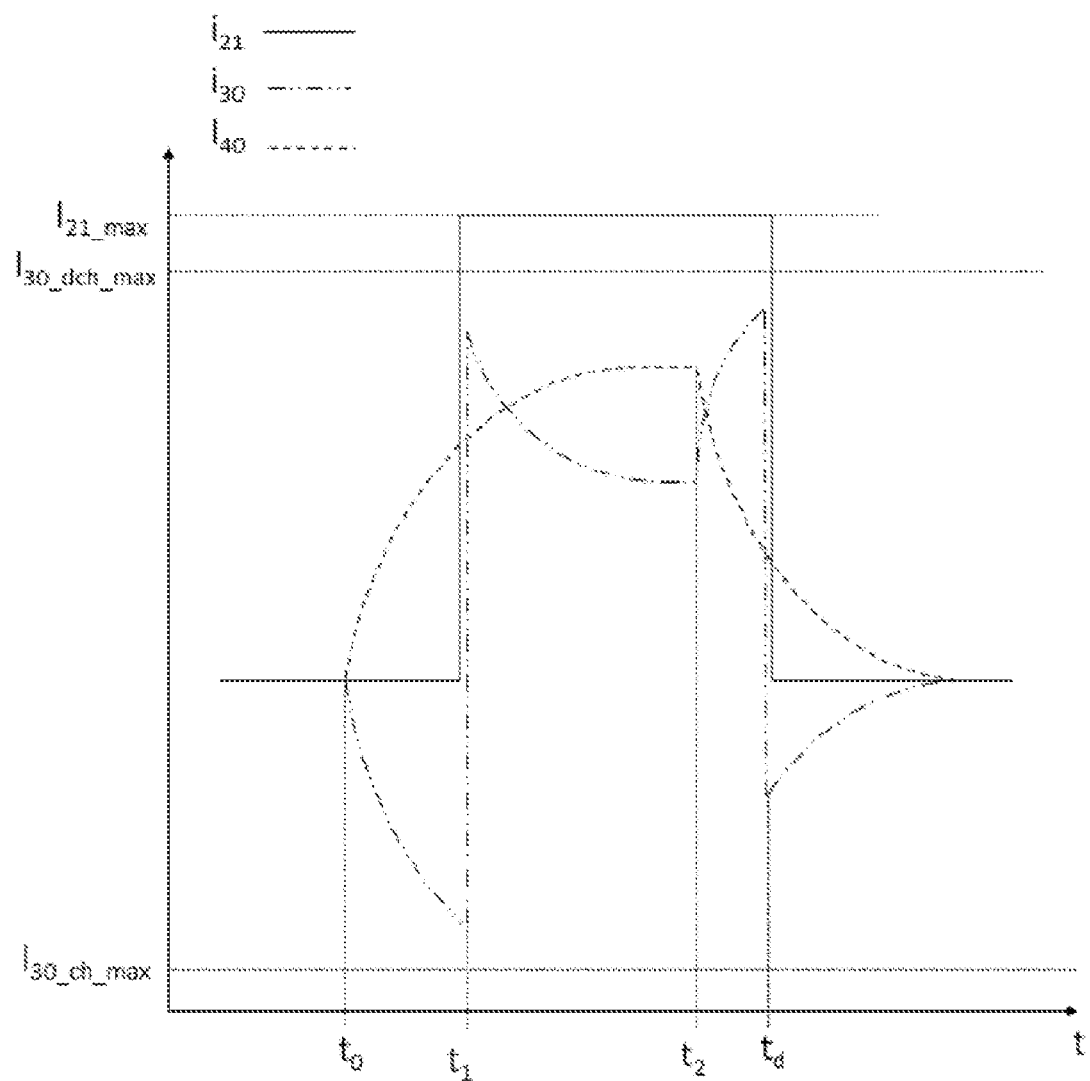
FIG. 3 shows a first example of the variation in the current of the battery, the variation in the current of the electric machine and the variation in the current in the heating system as a function of time according to an aspect of the invention.

FIG. 3 shows a first example of the variation in the current $i_{21}$ in the heating system 21, of the variation in the charge or discharge current $i_{30}$ of the battery 30 and of the variation in the charge or discharge current $i_{40}$ of the electric machine 40, as a function of time, when the high intensity $i_{21\_max}$ of the current in the heating system $i_{21}$ is greater than the absolute value of the predefined maximum discharge threshold $I_{30\_dch\_max}$ of the battery 30.

The control unit 50 is also configured to activate the generator mode of the electric machine 40 at an initial time $t_0$. To this end, the control unit 50 is notably able to control the torque of the electric machine 40.

The control unit 50 is also configured to electrically connect the heating system 21 to the electric power supply network 10 at a first time $t_1$, defined after the initial time $t_0$. Thus, the heating system 21 is supplied with power by the electric network 10.

To this end, the control unit 50 is configured to send, at the first time $t_1$, a connection message to the second control unit, so that said unit sends a connection signal to the switch. In another embodiment, the control unit 50 sends the second control unit a first information message comprising the value of the first time $t_1$, at which the second control unit must connect the heating system 21 to the electric network 10 via the switch.

Notably, the control unit 50 is configured to determine the value of the first time $t_1$.

Figure 4:
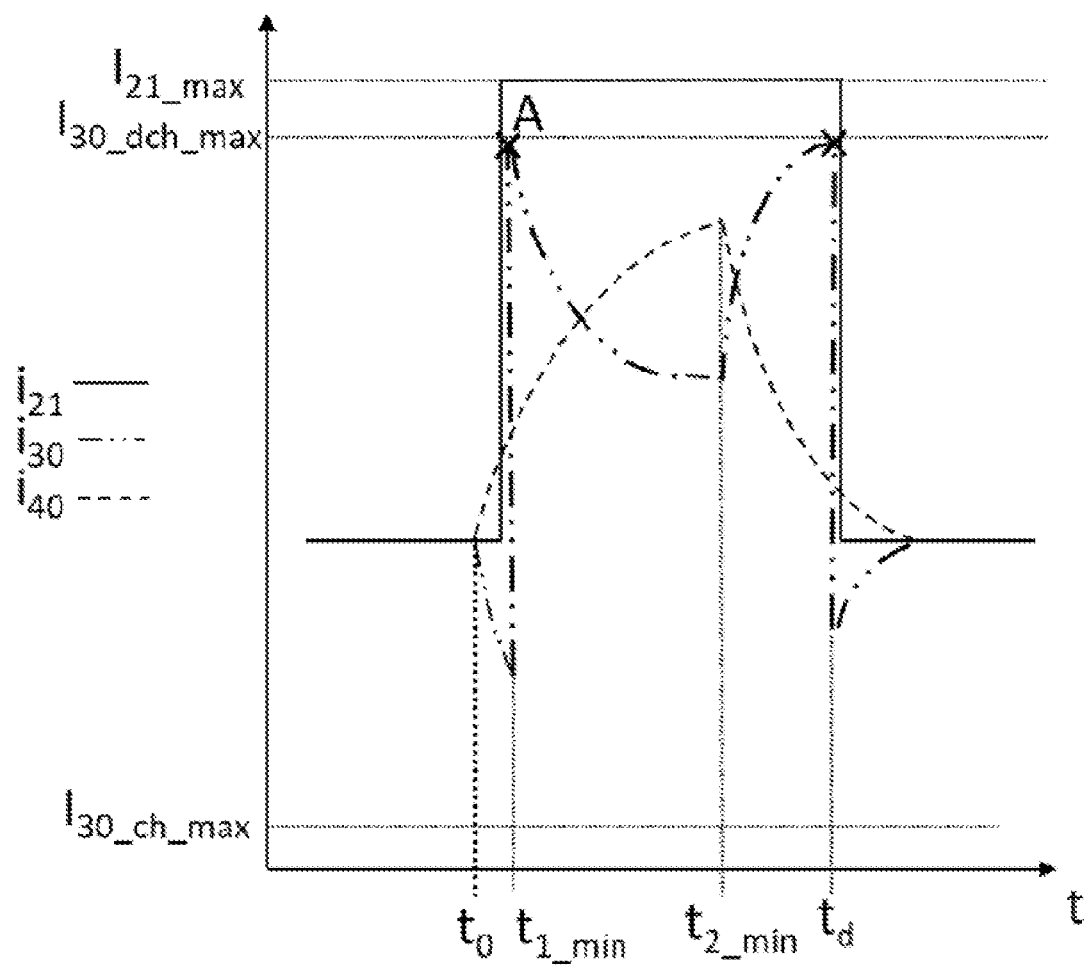
FIG. 4 shows a second example of the variation in the current of the battery, the variation in the current of the electric machine and the variation in the current in the heating system as a function of time according to an aspect of the invention.

To this end, with reference to FIG. 4, the control unit 50 is configured to determine, from the determined variation in the charge and discharge current in the battery 30, a first minimum time $t_{1\_min}$. The first minimum time $t_{1\_min}$ corresponds to the time at which the heating system 21 is electrically connected to the electric network 10, so that the current $i_{30}$ in the battery 30 is equal to the maximum discharge threshold $I_{30\_dch\_max}$ predefined at said first minimum time $t_{1\_min}$.

Figure 5:
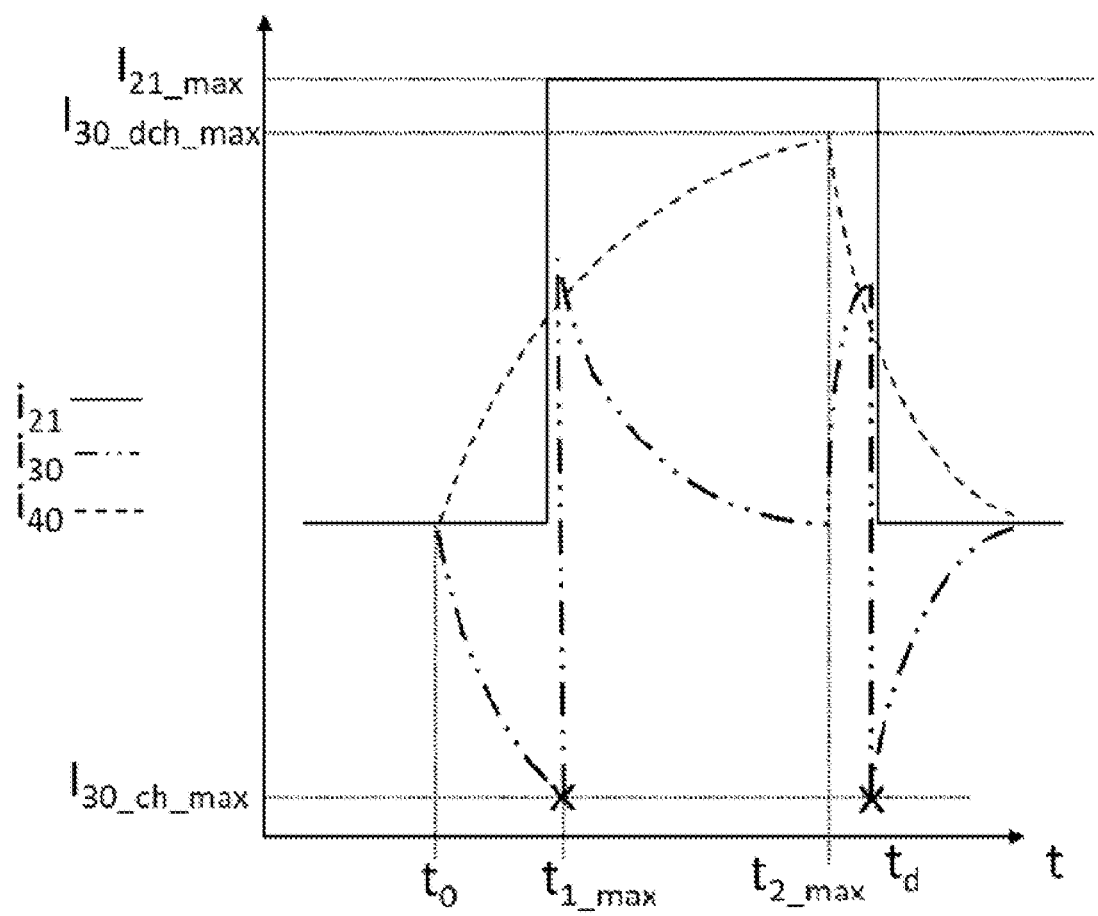
FIG. 5 shows a third example of the variation in the current of the battery, the variation in the current of the electric machine and the variation in the current in the heating system as a function of time according to an aspect of the invention.

Furthermore, with reference to FIG. 5, the control unit 50 is also configured to determine, from the determined variation in the charge and discharge current in the battery 30, a first maximum time $t_{1\_max}$. The first maximum time $t_{1\_max}$ corresponds to the time at which the heating system 21 is electrically connected to the electric network 10, so that the current $i_{30}$ in the battery 30 is equal to the maximum charge threshold $i_{30\_ch\_max}$ at said first maximum time $t_{1\_max}$.

The first time $t_1$ corresponds to any value ranging between the first minimum time $t_{1\_min}$ and the first maximum time $t_{1\_max}$. Preferably, the control unit 50 is configured to determine the first time $t_1$ by computing the average of the first minimum time $t_{1\_min}$ and of the first maximum time $t_{1\_max}$.

With further reference to FIG. 3, the control unit 50 is also configured to detect the need to deactivate the heating system 21.

To this end, the control unit 50 can be configured to detect the transmission of a deactivation signal by the second control unit. The control unit 50 also can be configured to itself estimate, from the variation in the current $i_{21}$, the time from which the high intensity $i_{21\_max}$ is no longer applied.

The control unit 50 is also configured to activate the motor mode of the electric machine 40 at a second time $t_2$, defined after the first time and before the disconnection time $t_d$, during which the heating system 21 is disconnected from the electric network 10.

Notably, the control unit 50 is configured to determine the second time $t_2$ from the variation in the charge and discharge current in the battery 30 that is determined and/or stored in the memory zone MEM.

To this end, with reference to FIG. 4, the control unit 50 is configured to determine, from the determined variation in the charge and discharge current in the battery 30, a second minimum time $t_{2\_min}$. The second minimum time $t_{2\_min}$ corresponds to the time at which the motor mode of the electric machine 40 is activated, so that at the disconnection time $t_d$, the current $i_{30}$ in the battery 30 is equal to the maximum discharge threshold $I_{30\_dch\_max}$.

Furthermore, with reference to FIG. 5, the control unit 50 is configured to determine, from the determined variation in the charge and discharge current in the battery 30, a second maximum time $t_{2\_max}$ at which the motor mode of the electric machine 40 is activated, so that at the disconnection time $t_d$, the current $i_{30}$ in the battery 30 is equal to the maximum charge threshold $I_{30\_ch\_max}$.

The second time $t_2$ corresponds to any value ranging between the second minimum time $t_{2\_min}$ and the second maximum time $t_{2\_max}$. Preferably, the control unit 50 is configured to determine the second time $t_2$ by computing the average of the first minimum time $t_{2\_min}$ and of the first maximum time $t_{2\_max}$.

The control unit 50 is also configured to disconnect the heating system 21 from the electric network 10.

To this end, the control unit 50 is configured to send, at the disconnection time $t_d$, a disconnection message to the second control unit, so that said unit sends a disconnection signal to the switch. In another embodiment, the control unit 50 sends the second control unit a second information message comprising the value of the disconnection time $t_d$, at which the second control unit must disconnect the heating system 21 from the electric network 10 via the switch.

Method

Figure 6:
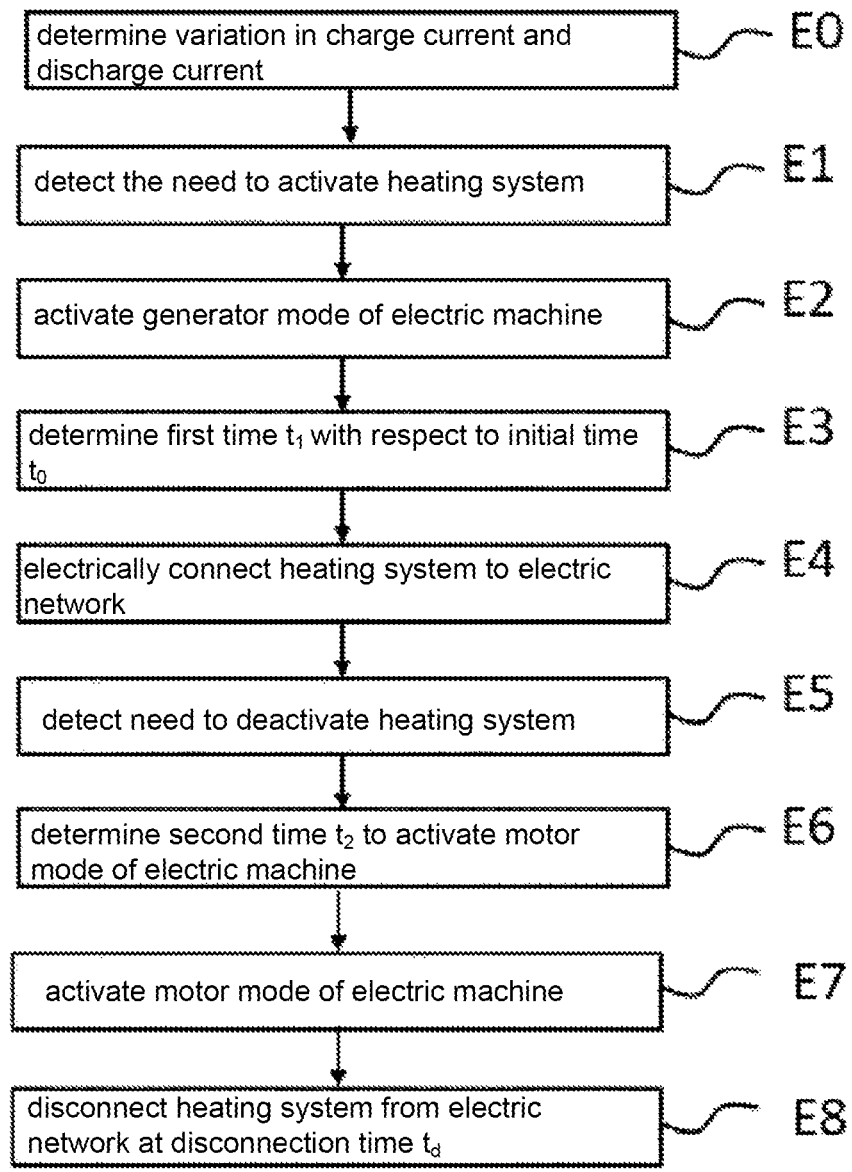
FIG. 6 illustrates one embodiment of the method according to the invention.

With reference to FIG. 6, an embodiment will now be described of the method according to the invention, implemented by the control unit as described above.

The method comprises a preliminary step E0 of the control unit 50 determining the variation in the charge current and in the discharge current in the battery 30 as a function of various parameters stored in the memory zone MEM and notably the temperature, the state of charge (or the state of discharge) of the battery 30 and of all the equipment connected to the electric network 10 and operating (in other words the equipment that uses the current from the electric network 10). More specifically, the control unit 50 selects the variation in the charge current and in the discharge current from the correspondence table as a function of the aforementioned parameters.

During the preliminary step E0, the control unit 50 can determine the variation in the current $i_{21}$ in the heating system 21 (shown in FIG. 2), from the period T and the temporal pulse width $t_h$ of the pulse width modulation signal applied to the heating system 21.

The control unit therefore knows the duration between the first time $t_1$ and the disconnection time $t_d$, but does not yet know when the first time $t_1$ is defined.

The method then comprises a step E1 of detecting the need to activate the heating system 21. During this step, the control unit 50 detects that the second control unit has sent an activation signal to the heating system 21. According to another embodiment, the control unit 50 itself detects a request to activate the heating system 21, notably by detecting the arrival of a rising edge on the previously determined current variation $i_{21}$ of the heating system 21.

With reference to FIGS. 3 and 6, the method then comprises a step E2 of activating the generator mode of the electric machine 40 at the initial time $t_0$. During said activation step E2, the control unit 50 sends a command to the electric machine 40 so that it supplies electric energy to the electric network 10. As a result, the battery 30 is charged from the current $i_{40}$ supplied by the electric machine 40 to the electric network 10.

The method then comprises a step E3 of determining the first time $t_1$, with respect to the initial time $t_0$. The first time $t_1$ defines the time at which the control unit 50 commands the connection of the heating system 21 to the electric network 10.

To this end, the control unit 50 determines the first minimum time $t_{1\_min}$ and the first maximum time $t_{1\_max}$ from the estimated variation in the charge and discharge current of the battery 30 and the initial time $t_0$. The control unit 50 then selects a value ranging between the first minimum time $t_{1\_min}$ and the first maximum time $t_{1\_max}$ in order to determine the first time $t_1$. Preferably, the first time $t_1$ corresponds to the average value between the first minimum time $t_{1\_min}$ and the first maximum time $t_{1\_max}$.

Thus, between the initial time $t_0$ and the first time $t_1$, the electric machine 40 supplies electric energy to the electric network 10 and the battery 30 charges from the current $i_{40}$ supplied by the electric machine 40 to the electric network 10.

The method then comprises a step E4 of electrically connecting the heating system 21 to the electric network 10 at the first time $t_1$ thus determined. From the first time $t_1$, the battery 30 operates in the discharge mode and powers the electric network 10.

Thus, after the first time $t_1$, the heating system 21 is powered with current by virtue of the battery 30 and the electric machine 40 that supply current to the electric network 10. Notably, if the first time $t_1$ is closer to the first minimum time $t_{1\_min}$ than to the first maximum time $t_{1\_max}$, then the heating system 21 is supplied with more power by the battery 30 than by the electric machine 40, immediately after the first time $t_1$. If the first time $t_1$ is closer to the first maximum time $t_{1\_max}$ than to the first minimum time $t_{1\_min}$, then the heating system 21 is powered more by the electric machine 40 than by the battery 30, immediately after the first time $t_1$. If the first time $t_1$ corresponds to the average between the first minimum time $t_{1\_min}$ and the first maximum time $t_{1\_max}$, then the heating system 21 is powered by the electric machine 40 and by the battery 30 in substantially the same proportions. In the three cases that have been described, the value of the charge or discharge current $i_{30}$ of the battery 30 ranges between the value of the maximum charge threshold $I_{30\_ch\_max}$ and the value of the maximum discharge threshold $I_{30\_dch\_max}$.

The method then comprises a step E5 of detecting the need to deactivate the heating system 21. Notably, the control unit 50 detects the transmission of a deactivation signal by the second control unit to the heating system 21.

The control unit 50 can also detect the arrival of a falling edge on the determined variation in the current $i_{21}$ of the heating system 21.

The method then comprises a step E6 of determining the second time $t_2$, at which the control unit 50 will activate the motor mode of the electric machine 40. The second time $t_2$ is defined after the first time $t_1$ and before the disconnection time $t_d$.

The method then comprises a step E7 of activating the motor mode of the electric machine 40, at the second time $t_2$. To this end, the control unit 50 sends an activation signal to the electric machine 40.

Thus, between the first time $t_1$ and the second time $t_2$, the heating system 21 is powered by the battery 30 and the electric machine 40, which supply the electric network 10 with current.

Finally, the method comprises a step E8 of disconnecting the heating system 21 from the electric network 10 at the disconnection time $t_d$. During this step, the control unit 50 sends, at the disconnection time $t_d$, a disconnection message to the second control unit, so that said unit sends a disconnection signal to the switch. In another embodiment, the control unit 50 sends a second information message comprising the value of the disconnection time $t_d$, at which the second control unit must disconnect the heating system 21 from the electric network 10 via the switch.

Notably, if the second time $t_2$ is closer to the second minimum time $t_{2\_min}$ than to the second maximum time $t_{2\_max}$, then the heating system 21 is powered more by the battery 30 than by the electric machine 40 between the second time t2 and the disconnection time $t_d$. If the second time $t_2$ is closer to the second maximum time $t_{2\_max}$ than to the second minimum time $t_{2\_min}$, then the heating system 21 is powered more by the electric machine 40 than by the battery 30, between the second time $t_2$ and the disconnection time $t_d$. If the second time $t_2$ corresponds to the average between the second minimum time $t_{2\_min}$ and the second maximum time $t_{2\_max}$, then the heating system 21 is powered by the electric machine 40 and by the battery 30 in substantially the same proportions. In this case, the value of the charge or discharge current $i_{30}$ of the battery 30 ranges between the value of the maximum charge threshold $I_{30\_ch\_max}$ and the value of the maximum discharge threshold $I_{30\_dch\_max}$.

Thus, the fact that activation of the generator mode of the electric machine 40 is anticipated with respect to the first time $t_1$, at which the heating system 21 is connected to the electric network 10, and the fact that activation of the motor mode of the electric machine 40 is anticipated with respect to the disconnection time $t_d$, allows the current in the battery 30 to range between the maximum charge threshold $I_{30\_ch\_max}$ and the maximum discharge threshold $I_{30\_dch\_max}$. Thus, this avoids a degradation in the operating state of the battery 30 that is caused when the absolute value of the current of the battery 30, when operating in the charge mode, is greater than the absolute value of the maximum charge threshold $I_{30\_ch\_max}$, or when the absolute value of the current of the battery 30, when operating in the discharge mode, is greater than the absolute value of the maximum discharge threshold $I_{30\_ch\_max}$.

The invention claimed is:

1. A control unit for a hybrid motor vehicle with a combustion engine, said motor vehicle comprising:
   a) an electric network;
   b) a catalytic converter able to depollute the exhaust gases emitted by the combustion engine and comprising an electric heating system connected to the electric network;
   c) a battery electrically connected to the electric network, able to operate in a discharge mode, in which the battery supplies electric energy to the electric network, and in a charge mode, in which the battery is charged from the electric energy supplied by the electric network;
   d) an electric machine electrically connected to the electric network, able to operate in a generator mode, in which the electric machine supplies electric energy to the electric network, and in a motor mode, in which the electric machine generates mechanical energy from the electric energy supplied by the electric network;
   said control unit being electrically connected to the electric heating system, to the battery and to the electric machine, and being configured for:
   activating the generator mode of the electric machine;
   electrically connecting the heating system to the electric power supply network at a first time, defined after a first predetermined delay with respect to the activation time of the generator mode;
   activating the motor mode of the electric machine, at a second time, defined after the first time; and
   disconnecting the heating system from the electric network at a "disconnection" time, defined after the second time.

2. The control unit as claimed in claim 1, wherein the battery has a maximum charge threshold and a maximum discharge threshold, the value of the first time ranges between the value of a first minimum time and a first maximum time:
   a) the first minimum time corresponding to the time at which the heating system is electrically connected to the electric network, so that the current in the battery is equal to the maximum discharge threshold predefined at said first minimum time; and
   b) the first maximum time corresponds to the time at which the heating system is electrically connected to the electric network, so that the current in the battery is equal to the maximum charge threshold at said first maximum time.

3. The control unit as claimed in claim 2, wherein the battery has a maximum charge threshold and a maximum discharge threshold, the value of the second time ranges between the value of a second minimum time and a second maximum time:
 a) the second minimum time corresponds to the time at which the motor mode of the electric machine is activated, so that at the time of disconnecting the heating system from the electric network, the current in the battery is equal to the maximum discharge threshold; and
 b) the second maximum time corresponds to the time at which the motor mode of the electric machine is activated, so that at the disconnection time, the current in the battery is equal to the maximum charge threshold.

4. The control unit as claimed in claim 1, wherein the battery has a maximum charge threshold and a maximum discharge threshold, the value of the second time ranges between the value of a second minimum time and a second maximum time:
 a) the second minimum time corresponds to the time at which the motor mode of the electric machine is activated, so that at the time of disconnecting the heating system from the electric network, the current in the battery is equal to the maximum discharge threshold; and
 b) the second maximum time corresponds to the time at which the motor mode of the electric machine is activated, so that at the disconnection time, the current in the battery is equal to the maximum charge threshold.

5. The control unit as claimed in claim 1, comprising a memory zone that stores a correspondence table comprising, for each combination of a state of charge of the battery and a temperature of said battery, the variation in the charge current and in the discharge current of the battery as a function of time, the control unit is configured to determine the variation in the charge current of the battery and the variation in the discharge current of the battery from the temperature of the battery, the state of charge of the battery and the correspondence table.

6. The control unit as claimed in claim 1, wherein the memory zone comprises: the period, the duty cycle or the pulse width of the current in the heating system and the predefined average intensity of the current in the heating system, the control unit being configured to determine the variation in the current in the heating system from the preceding parameters.

7. A hybrid motor vehicle with a combustion engine comprising:
 a) an electric network;
 b) a catalytic converter able to depollute the exhaust gases emitted by the internal combustion engine and comprising an electric heating system;
 c) a battery electrically connected to the electric network, able to operate in a discharge mode, in which the battery supplies electric energy to the electric network, and in a charge mode, in which the battery is charged from the electric energy supplied by the electric network;
 d) an electric machine electrically connected to the electric network, able to operate in a generator mode, in which the electric machine supplies electric energy to the electric network, and in a motor mode, in which the electric machine generates mechanical energy from the electric energy supplied by the electric network; and
 e) a control unit electrically connected to the electric heating system, to the battery and to the electric machine, and being configured for:
  activating the generator mode of the electric machine;
  electrically connecting the heating system to the electric power supply network at a first time, defined after a first predetermined delay with respect to the activation time of the generator mode;
  activating the motor mode of the electric machine, at a second time, defined after the first time; and
  disconnecting the heating system from the electric network at a "disconnection" time, defined after the second time.

8. A method for powering a heating system for a hybrid motor vehicle as claimed in claim 7, said method, implemented by the control unit, the method comprising:
 a) activating the generator mode of the electric machine;
 b) electrically connecting the heating system to the electric power supply network, at a first time, defined after a first predetermined delay with respect to the activation time of the generator mode;
 c) activating the motor mode of the electric machine, at a second time, defined after the first time; and
 d) disconnecting the heating system from the electric network at a "disconnection" time, defined after the second time.

9. The method as claimed in claim 8, the battery having a maximum charge threshold and a maximum discharge threshold, the method comprising, before the electrical connection step, a step of determining the first time, and further comprising:
 a) determining a first minimum time, the first minimum time corresponding to the time at which the heating system is electrically connected to the electric network, so that
  the current in the battery is equal to the predefined maximum discharge threshold, at said first minimum time,
 b) determining a first maximum time, the first maximum time corresponding to the time at which the heating system is electrically connected to the electric network, so that the current in the battery is equal to the maximum charge threshold at said first maximum time; and
 c) determining the first time by selecting a value ranging between the value of the first minimum time and the value of the first maximum time.

10. The method as claimed in claim 9, the battery having a maximum charge threshold and a maximum discharge threshold, the method comprising, prior to the step of activating the motor mode of the electric machine, a step of determining the second time, and further comprising:
 a) determining a second minimum time, the second minimum time corresponding to the time at which the motor mode of the electric machine is activated, so that at the disconnection time, the current in the battery is equal to the maximum discharge threshold;
 b) determining a second maximum time, corresponding to the time at which the motor mode of the electric machine is activated, so that at the disconnection time, the current in the battery is equal to the maximum charge threshold; and c) determining the second time by selecting a value ranging between the value of the second minimum time and the value of the second maximum time.

11. The method as claimed in claim 8, the battery having a maximum charge threshold and a maximum discharge threshold, the method comprising, prior to the step of activating the motor mode of the electric machine, a step of determining the second time, and further comprising:
- a) determining a second minimum time, the second minimum time corresponding to the time at which the motor mode of the electric machine is activated, so that at the disconnection time, the current in the battery is equal to the maximum discharge threshold;
- b) determining a second maximum time, corresponding to the time at which the motor mode of the electric machine is activated, so that at the disconnection time, the current in the battery is equal to the maximum charge threshold; and
- c) determining the second time by selecting a value ranging between the value of the second minimum time and the value of the second maximum time.

12. A non-transitory computer program product, comprising a set of program code instructions, which, when executed by one or more processors, configure the one or more processors to implement a method for powering a heating system for a hybrid motor vehicle as claimed in claim 7, said method, implemented by the control unit, the method comprising:
- a) activating the generator mode of the electric machine;
- b) electrically connecting the heating system to the electric power supply network, at a first time, defined after a first predetermined delay with respect to the activation time of the generator mode;
- c) activating the motor mode of the electric machine, at a second time, defined after the first time; and
- d) disconnecting the heating system from the electric network at a "disconnection" time, defined after the second time.

\* \* \* \* \*